Figure 1:
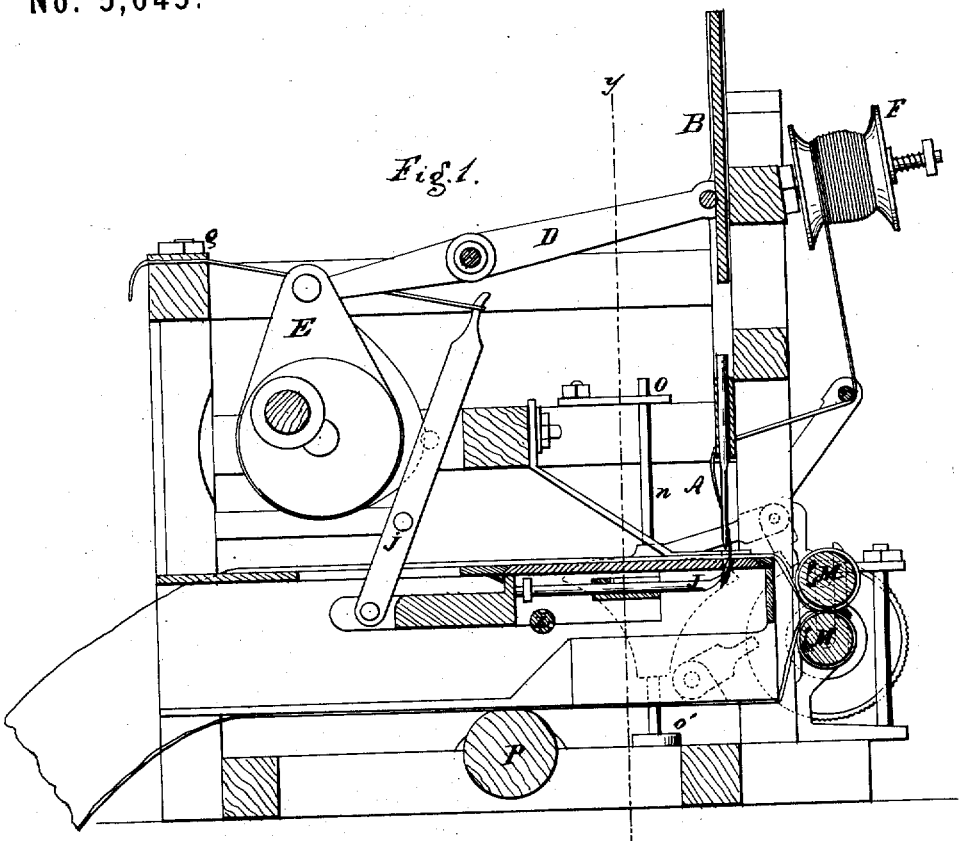

2 Sheets--Sheet 1.

Q. RICE.

Sewing-Machine.

No. 5,045.

Reissued Aug. 27, 1872.

Witnesses.
J. M. Kidder
L. H. Latimer.

Inventor
Quartus Rice
by his Attys.
Crosby & Fowler.

2 Sheets--Sheet 2.

Q. RICE.

Sewing-Machine.

No. 5,045. Reissued Aug. 27, 1872.

Witnesses.
S. B. Kidder
L. H. Latimer.

Inventor.
Quartus Rice
by his Attys.
Crosby & Gould

UNITED STATES PATENT OFFICE.

QUARTUS RICE, OF WASHINGTON, DISTRICT OF COLUMBIA, ASSIGNOR, BY MESNE ASSIGNMENTS, TO JOHN C. HOADLEY, TRUSTEE.

IMPROVEMENT IN SEWING-MACHINES.

Specification forming part of Letters Patent No. 210, dated January 22, 1861; reissue No. 5,045, dated August 27, 1872.

Specification describing a Machine for Making Hydraulic Hose, &c., invented by QUARTUS RICE, now of Washington, District of Columbia, formerly of Nevada, California.

The invention relates to sewing continuous tubular work, of indefinite length, for hydraulic hose and analogous purposes; and it consists, primarily, in the combination, with a suitable stitch-forming mechanism, of a suitable guiding mechanism, by means of which a flat strip of continuous length is so turned, and has its edges so brought together and lapped, that the lapped edges will be so presented to the stitch-forming mechanism as to cause the edges to be united by one or more rows of stitches, the strip passing into the machine in the form of a flat strip and emerging as a tube, the feed of the strip, its formation into a tube, and the formation of the stitches being a continuous automatic operation.

The drawing represents a machine embodying my invention.

Figure 3:
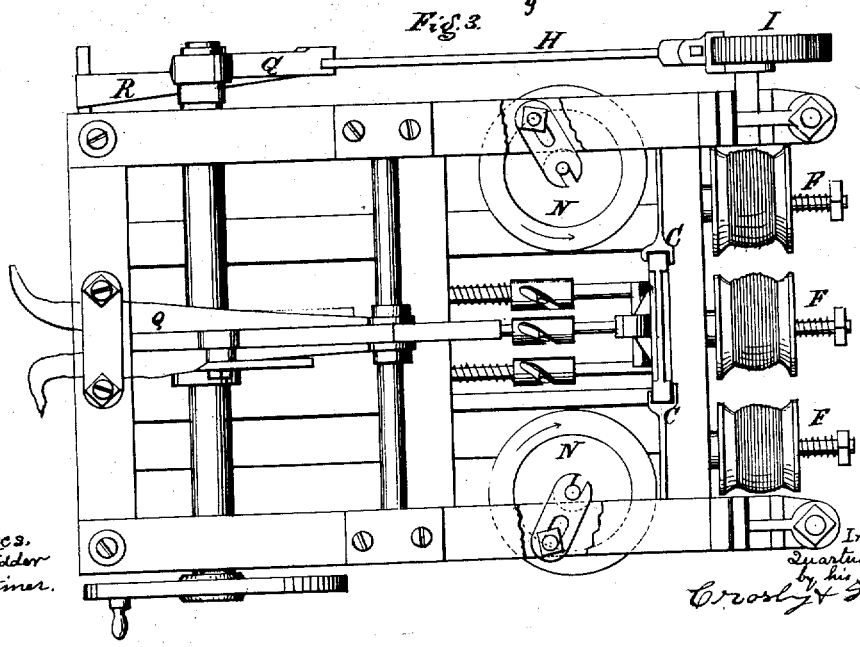
Figure 2:
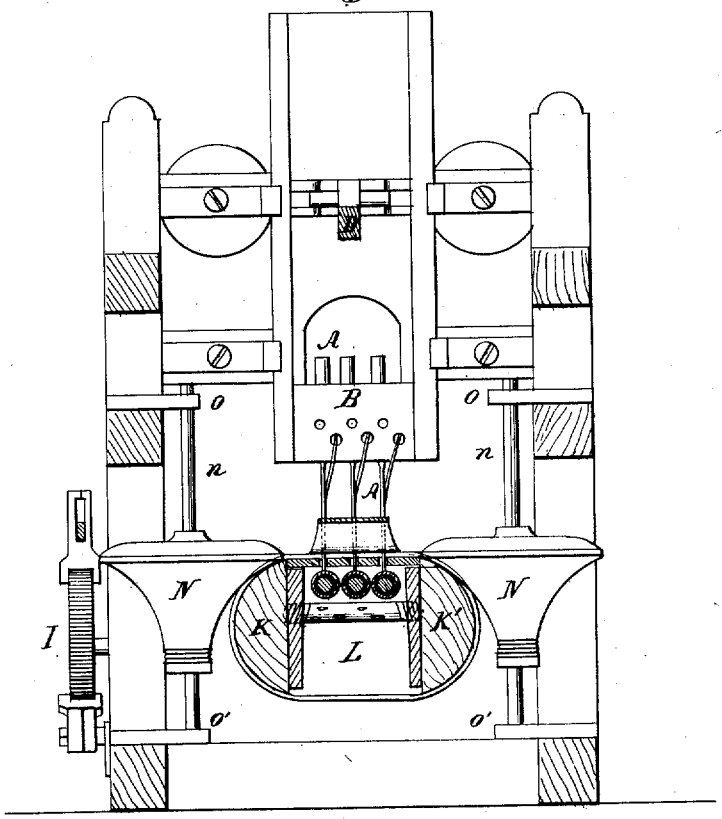

Figure 1 is a horizontal section of the machine. Fig. 2 is a transverse section on the line *y y*, but showing the adjusting-screw of the gage. Fig. 3 is a plan.

In the drawing three needles, A, are represented working side by side in a common needle-carrier, B, reciprocated in guides C by means of lever D and crank E. These parts, as well as the spools F, feed-movement G H I, and loopers J, may be of common construction and arrangement, and therefore require no specific description. K K′ are two parts of a gage having, together, an approximately cylindrical form, and adjusted in distance asunder by means of a shaft, L, having a right and left screw at its respective ends. M M are feed-rollers, rotated in direction of the arrows. In practice the said rollers are placed at a considerable distance from the gage K K′, so that the finished hose will pass freely off the end of the latter and between the rollers. N N are guide-rollers formed and placed as shown in Figs. 1 and 2, and mounted upon shafts *n n* journaled in bearings O O′, the upper of which, O, are clamped adjustably to the frame by means of a screw bolt and nut, so as to permit the adjustment of the upper ends of the shafts in a line parallel with the axis of the gage K K′, so as to set the rollers vertically, or at any needful inclination to vary their effect upon the cloth, as will be hereinafter explained. P is an additional feed-roller, rotated in the direction indicated by the arrow, and operating to forward the cloth and keep it in place beneath the gage. Q and R are springs operating to retract the looper and feed-levers, respectively.

The operation is as follows: The cloth is placed beneath and around the gage, with its edges uppermost, and, passing within the rollers N and P, it is tightly compressed upon the gage, so that its edges meet and lap at top, and in this position pass under the action of the needles, by which they are tightly stitched together with three parallel seams. The completed hose, after passing off the end of the gage, is drawn between the feed-rollers M, the rotation of which imparts to it the needful intermittent motion.

It will be observed that the attachment of the gage K K′ is wholly at top and at its rear end, so that the strip of cloth may be introduced beneath it at back, and, after passing the lever *j* of the loopers, may meet with no obstruction to the connection of its edges. By this means continuous tubing of indefinite length may be produced. To form tubing of smaller or larger diameter, the distance between the parts K and K′ of the gage is diminished or increased by the rotation of the shaft L. By setting the upper ends of the shafts *n* of the guide-rollers N forward or backward, the tightness of the compression of the cloth around the gage may be regulated as desired. The positions of the cloth and the thread are indicated by dotted lines.

By a machine organized in this or an equivalent manner a new article is formed—namely, a tube of indefinite length, or a tube in which the edges are joined by loops of a continuous thread or threads passing through and uniting the edges without carrying the entire length of thread through, the fastenings or loops being connected, but each being formed by passing through the edges only that part of the thread which is to enter into the formation of such stitch, or of one stitch and one or more immediately adjacent to it.

I claim—

The combination, substantially as described, of a stitch-forming mechanism, a feed mechanism, and a guide mechanism, relatively arranged, and operating to continuously form, from a flat strip, a tube with edges united by a row or rows of stitches.

QUARTUS RICE.

Witnesses:

JOHN J. HALSTED,

JARVIS MOULDEN.